(12) United States Patent
Brown et al.

(10) Patent No.: US 7,739,141 B2
(45) Date of Patent: Jun. 15, 2010

(54) CONSULTING ASSESSMENT ENVIRONMENT

(75) Inventors: Nigel Howard Julian Brown, Richmond Hill (CA); Yim Y. Chan, Richmond Hill (CA); Christopher James Dolder, London (GB); Marie-Paule Christyne Gauthier, Toronto (CA); Howard Young, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1559 days.

(21) Appl. No.: 10/617,528

(22) Filed: Jul. 10, 2003

(65) Prior Publication Data

US 2005/0010469 A1    Jan. 13, 2005

(51) Int. Cl.
*G06Q 90/00* (2006.01)
(52) U.S. Cl. .............................................. 705/10; 705/7
(58) Field of Classification Search .................... 705/7, 705/10
See application file for complete search history.

(56) References Cited

U.S. PATENT DOCUMENTS

| | | | | |
|---|---|---|---|---|
| 5,084,819 A | * | 1/1992 | Dewey et al. | 434/262 |
| 5,717,865 A | * | 2/1998 | Stratmann | 705/10 |
| 5,960,419 A | * | 9/1999 | Fagg et al. | 706/59 |
| 5,963,931 A | * | 10/1999 | Fagg et al. | 706/50 |
| 5,978,784 A | * | 11/1999 | Fagg et al. | 706/45 |
| 6,009,420 A | * | 12/1999 | Fagg et al. | 706/45 |
| 6,322,504 B1 | | 11/2001 | Kirshner | 600/300 |
| 6,421,655 B1 | | 7/2002 | Horvitz et al. | 706/61 |
| 6,470,482 B1 | | 10/2002 | Rostoker et al. | 716/6 |
| 2002/0173999 A1 | * | 11/2002 | Griffor et al. | 705/7 |
| 2003/0126049 A1 | * | 7/2003 | Nagan et al. | 705/35 |
| 2003/0158800 A1 | * | 8/2003 | Pisello et al. | 705/35 |
| 2004/0010441 A1 | * | 1/2004 | Nandigama et al. | 705/10 |
| 2004/0068429 A1 | * | 4/2004 | MacDonald | 705/10 |
| 2004/0172317 A1 | * | 9/2004 | Davis et al. | 705/7 |
| 2005/0043985 A1 | * | 2/2005 | Gillespie | 705/10 |

* cited by examiner

*Primary Examiner*—Beth V. Boswell
*Assistant Examiner*—Neil R Kardos
(74) *Attorney, Agent, or Firm*—Yee & Associates, P.C.; William H. Steinberg

(57) ABSTRACT

A method, apparatus, and computer program product for providing a consulting assessment environment. Consultants may use the environment to define templates that encode questionnaires and domain knowledge regarding business practices, as well as reporting criteria to specify the content and format of the assessment results. Consultants or their clients may use the environment to automate the process of performing assessments and generating reports from those assessments. These assessments may analyze the current state of the business, compare the business's current state with desired states or with best practices, and perform risk/benefit and/or cost/benefit analyses, according to the specifications made in the templates on a real-time basis for producing immediate assessment results and actions. An information hiding feature is provided to allow sensitive domain knowledge encoded within the templates, such as trade secrets, to be made inaccessible to clients.

21 Claims, 5 Drawing Sheets

CONSULTING ASSESSMENT ENVIRONMENT

BACKGROUND OF THE INVENTION

1. Technical Field

The present invention relates to an improved data processing system. In particular, the present invention relates to a method, apparatus, and computer instructions for providing a consulting assessment environment.

2. Description of Related Art

Consulting activities for business assessments are typically very time consuming, at least in part because they are largely discovery based. A discovery based approach for conducting assessments uses consulting subject matter experts who are specialists in working with a client to understand their business and identify how they can improve it. A prescriptive based approach uses consultants who are experts in best practices and through their experience and knowledge, identify the problems in a business and know the solutions to fix them. The market is now looking at prescriptive approaches based upon best practices. Many of the steps in the activities for consulting assessments are manual, which makes standardization of the consulting process difficult.

In addition, data preparations, such as translating hypotheses into interview questionnaires, conducting interviews, and summarizing interview data, are very labor-intensive and lengthy in duration. Many assessments produce results that summarize the current business state rather than analyzing the data to provide new business insights and recommendations. The lack of standardization results in inconsistent data, which complicates the process of data consolidation (i.e., combining data from various divisions or units in a business for the purpose of summarizing a larger partition of the business).

Tracking results and recommendations is difficult. Many clients are reluctant to engage consultants for assessment projects because of uncertainties regarding the deliverables as well as costs of follow-up assessments to monitor progress. For example, clients will typically engage consultants the first time to perform an assessment, but usually do not want to engage the consultants again for follow-up assessments. Clients often prefer to learn from the assessment process and then have the option of performing the assessment themselves.

Therefore, there is a need for a software tool to standardize and simplify the business assessment process.

SUMMARY OF THE INVENTION

The present invention provides a method, apparatus, and computer program product for providing a consulting assessment environment. Consultants may use the environment to define templates that encode questionnaires and domain knowledge regarding business practices, as well as reporting criteria to specify the content and format of the assessment results. Consultants or their clients may use the environment to automate the process of performing assessments and generating reports from those assessments. These assessments may analyze the current state of the business, compare the business's current state with desired states or with best practices, and perform risk/benefit and/or cost/benefit analyses, according to the specifications made in the templates. An information hiding feature is provided to allow sensitive domain knowledge encoded within the templates, such as trade secrets, to be made inaccessible to clients.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
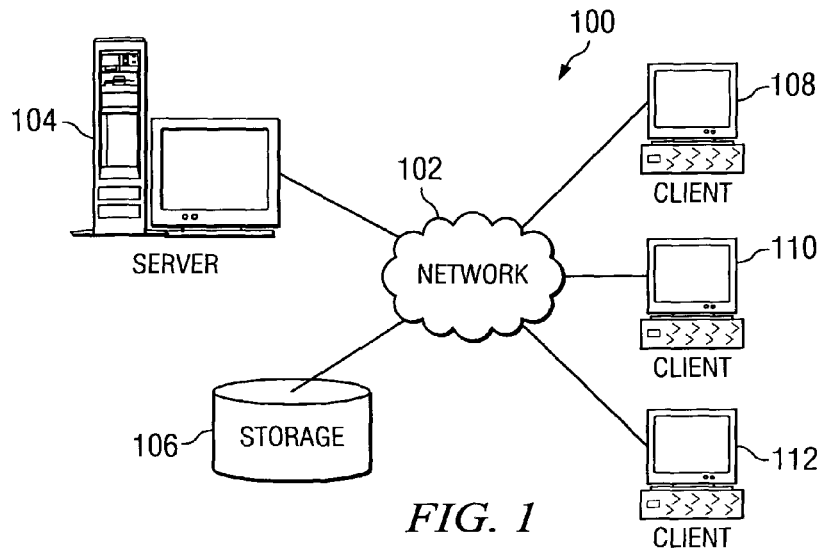
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
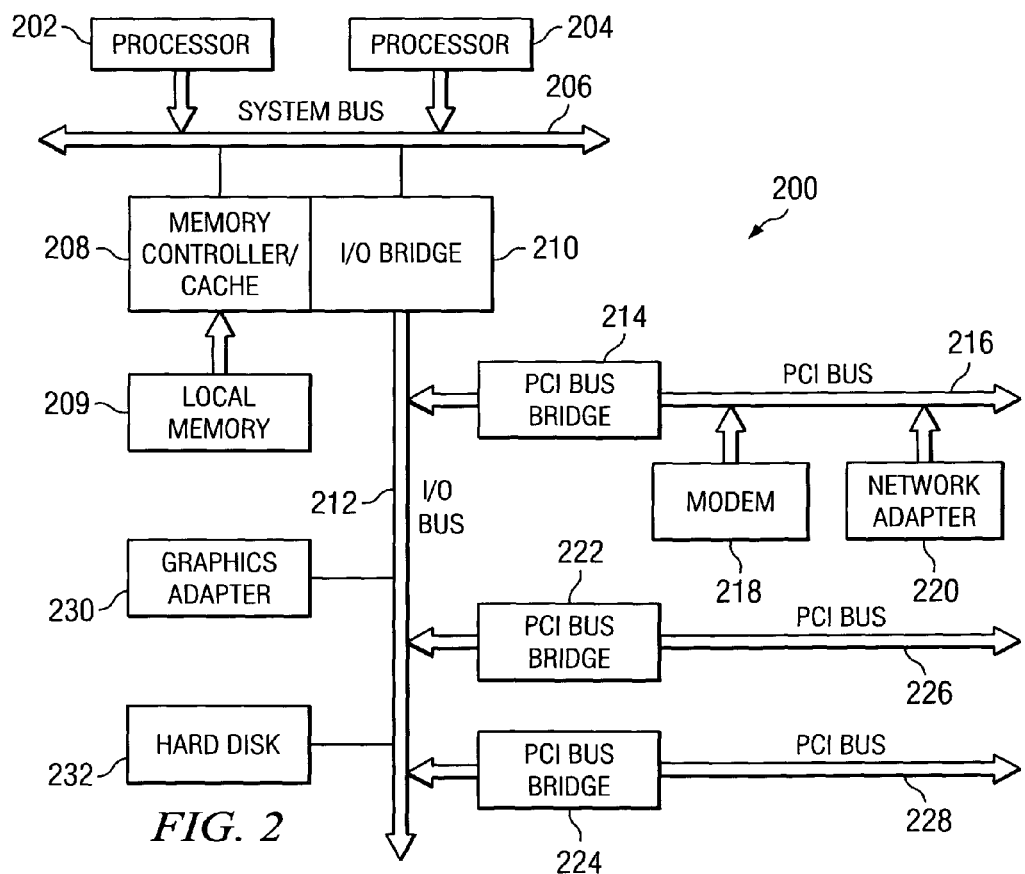
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
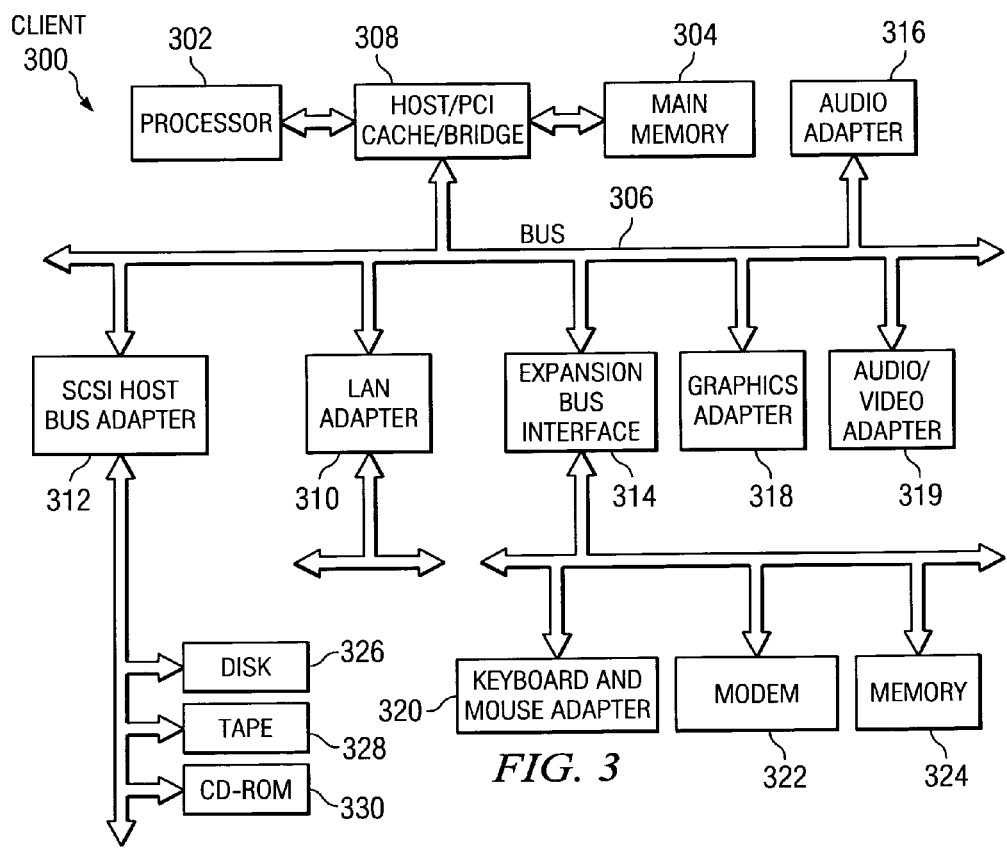
FIG. 3 illustrates a block diagram of a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. In a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer program product for providing a consulting assessment environment. Consultants may use the environment to define templates that encode questionnaires and domain knowledge regarding business practices, as well as reporting criteria to specify the content and format of the assessment results. Consultants or their clients may use the environment to automate the process of performing assessments and generating reports from those assessments.

Another important benefit of the present invention is the separation of the assessment data from the assessment business logic, which provides a framework for repeatability, reuse, and flexibility and allowing assessment data to be changed easily without having to modify the assessment business logic. This eliminates the need to build a new assessment tool for multiple types of assessments. Another significant advantage provided by a preferred embodiment of the present invention is an information hiding feature to allow sensitive domain knowledge encoded within the templates, such as trade secrets, to be made inaccessible to clients.

Figure 4:
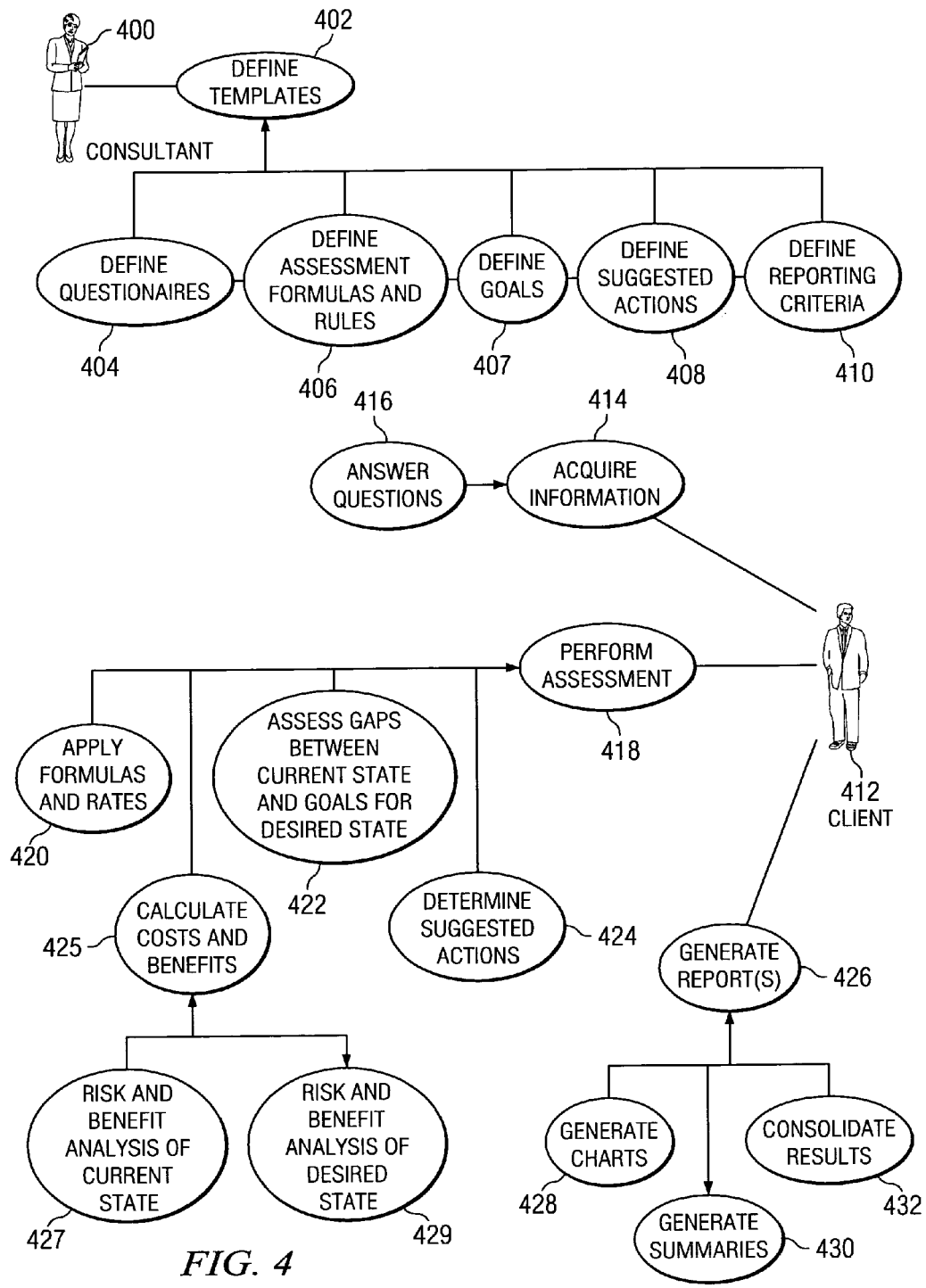
FIG. 4 is a use case diagram illustrating a consulting assessment environment in accordance with a preferred embodiment of the present invention.

FIG. 4 is a use case diagram illustrating a consulting assessment environment in accordance with a preferred embodiment of the present invention. Use cases (e.g., use case 402) are scenarios in which an actor (such as consultant 400 or client 412) uses a system (in this case, a software system) to perform one or more tasks.

Turning now to FIG. 4, consultant 400 uses the consulting assessment environment to define templates (define templates use case 402) for a consulting assessment environment. Templates are files or data structures that encode information that forms the basis for conducting an assessment. Templates may include, but are not limited to, questionnaires and/or forms for acquiring information to be used in the assessment, formula and/or logic rule definitions to define how acquired data is used to generate assessment results, definitions of suggested actions to be taken in response to various assessment results, and report forms and formats for specifying how the results of an assessment are to be presented in a human-readable form.

In a preferred embodiment, templates are workbook pages in a spreadsheet program that supports workbooks, such as MICROSOFT EXCEL. In an alternate embodiment using a programming language, such as Java, templates are data tables. Input forms, report forms, formulas, and logic rules may all be programmed into cells or groups of cells in spreadsheet workbook pages. As data is input into a questionnaire or input form of the workbook, the data is used to derive contents for all other cells that depend on that data. One of ordinary skill in the art will also appreciate that some spreadsheet programs, including MICROSOFT EXCEL, allow workbook pages to be hidden or made inaccessible to the ordinary user; this or another similar feature may be used to protect proprietary information encoded in one or more templates. In an alternative embodiment, the templates may be encoded into components of a database application in a database management system such as DB2 (an IBM database product).

Returning now to the diagram, define templates use case 402 is a generalization of a number of more specific template-definition use cases, including define questionnaires use case 404, define assessment formulas and rules use case 406, define goals use case 407, define suggested actions use case 408, and define reporting criteria use case 410. In define questionnaires use case 404, consultant 400 uses the consulting assessment environment for creating and collecting hypotheses and translating the hypotheses into questions to assess the current state of a business. The questions are input into data worksheets or data structures. In define assessment formulas and rules use case 406, consultant 400 creates calculations, formulas, logic, and rules for the framework of the assessment that leverages best practices and business consultant expertise. In define goals use case 407, consultant 400 defines the information for a desired state of a business, to encode knowledge of best practices or other business domain knowledge. In define suggested actions use case 408, consultant 400 defines actions to achieve a desired state of a business. Finally, in define reporting criteria use case 410, consultant 400 specifies the content and format for the data in report templates.

A client of consultant 400, such as client 412, may also use the consulting assessment environment to perform additional tasks associated with performing an assessment of a business. One of ordinary skill in the art will recognize that consultant 400 may also use the consulting assessment environment to perform these tasks. The number and type of templates may vary in alternate embodiments of the present invention.

Returning now to the diagram, in acquire information use case 414, client 412 uses the consulting assessment environment to acquire information about the business, via questionnaires defined in define questionnaires use case 404, for example, as represented by answer questionnaires use case 416.

In perform assessment use case 418, client 412 uses the consulting assessment environment to perform an assessment using templates (such as formulas and rules templates, suggested actions templates, and goals templates) defined by consultant 400. In a preferred embodiment, many of these analysis-related templates are hidden or otherwise made inaccessible to client 412. This allows client 412 to perform an assessment without revealing valuable information (e.g., trade secrets) about how the assessment is carried out.

Perform assessment use case 418 is a generalization of more specific use cases, and a complete assessment may include more than one of these more specific use cases. Some more specific use cases for performing assessments include, but are not limited to, applying formulas (use case 420), assessing gaps between the current state of the business and goals for a desired state (use case 422), determining suggested actions to be taken in furtherance of those goals (use case 424), and calculating costs and benefits (use case 425). Calculating costs and benefits use case 425 is a generalization of more specific use cases. Specifically, potential business risks and benefits of the business's current state may be determined (use case 427), and risks and benefits of taking action to move to some desired state may also be determined (use case 429).

Client 412 may also generate reports (use case 426) using templates defined by consultant 400. Specific report generation use cases include generating charts (use case 428), summarizing (e.g., in a text document) assessment results (use case 430), and consolidating the results from divisions or units of the business to create a more general assessment of a larger business unit or the business as a whole (use case 432).

The depicted example in FIG. 4 and above-described examples are not meant to imply limitations. There are multiple ways in which an embodiment of the present invention may be implemented, such as for example: (a) as a desktop application (such as MICROSOFT EXCEL), where the data template is prepared, and then data collected during the assessment period, and then uploaded to a server for data consolidation and archiving; (b) embedded in a software product where the code is written in a general-purpose programming language, such as Java, and would run on a server accessed through a network for all functions; and (c) as an application intended to be executed in a web browser, such as a Java applet or an application produced using FLASH, which is a product of Macromedia, Inc.

Figure 5:
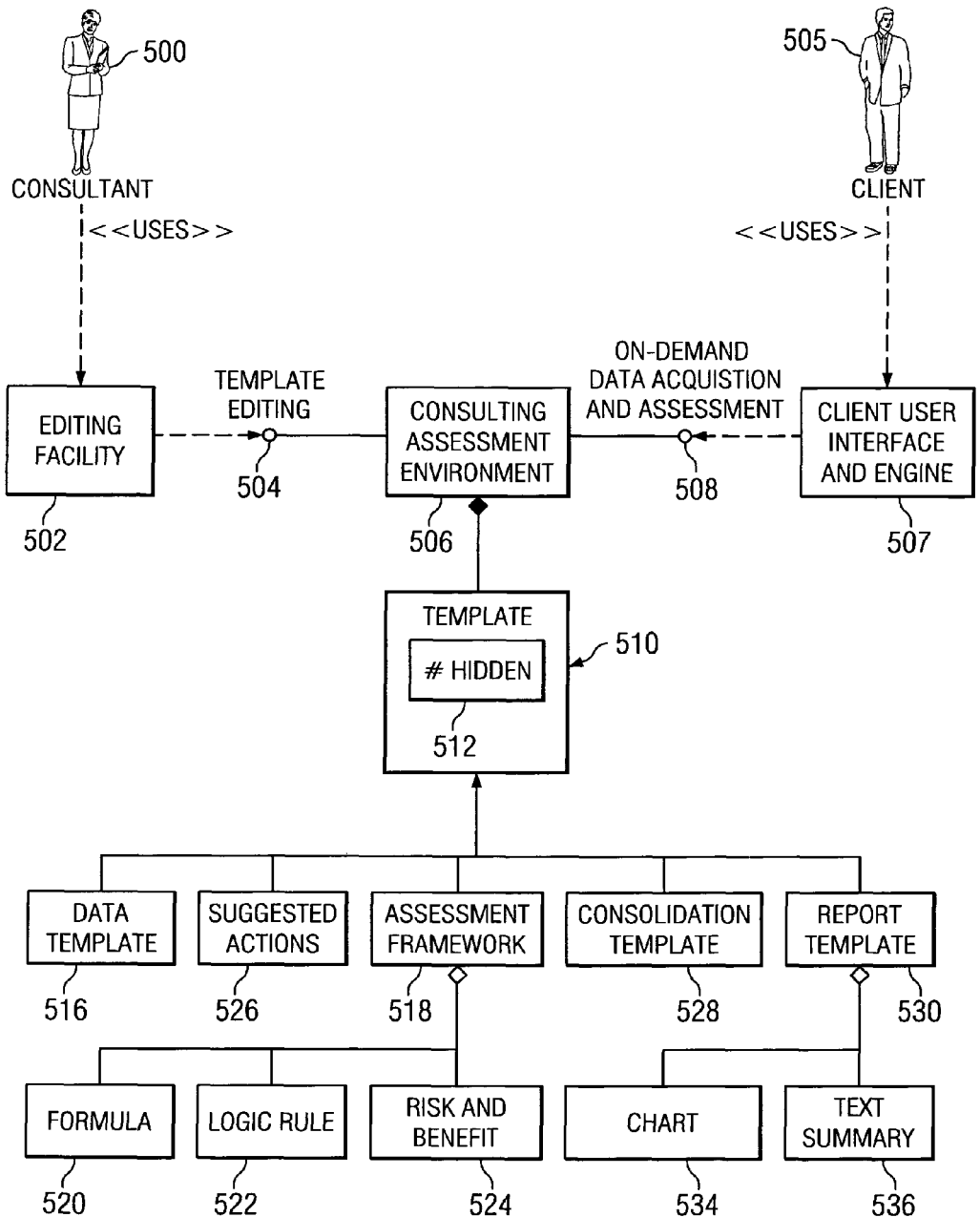
FIG. 5 is an annotated class diagram of a consulting assessment environment tool kit in accordance with a preferred embodiment of the present invention.

Next, FIG. 5 is an annotated class diagram of a consulting assessment environment tool kit in accordance with a preferred embodiment of the present invention. One of ordinary skill in the art will appreciate that the term "class" is used here in a general sense and that the "classes" described in FIG. 5 need not be classes in an object-oriented programming language, but may represent any data or program code element in a data processing system. The class diagram provided in FIG. 5 is presented to describe interrelationships between items of data and/or program code in a preferred embodiment of the present invention and should not be interpreted as implying that a particular architecture or implementation language is required in order to practice the present invention.

Turning now to FIG. 5, a consultant 500 uses an editing facility 502 to edit templates in consulting assessment environment 506, represented by template editing interface 504. In a preferred embodiment of the invention in which consulting assessment environment 506 takes the form of a MICROSOFT EXCEL spreadsheet workbook, editing facility 502 is provided by the MICROSOFT EXCEL program itself, through its graphical user interface (GUI). Other development tools may also be used for editing facility 502.

Client 505 uses client user interface and engine 507 to access consulting assessment environment 506 for the purpose of performing on-demand data acquisition and business assessment, represented by on-demand data acquisition and assessment interface 508. In a preferred embodiment of the invention in which consulting assessment environment 506 takes the form of a MICROSOFT EXCEL spreadsheet workbook, client user interface and engine 507 is provided by the MICROSOFT EXCEL program itself, as MICROSOFT EXCEL provides both a graphical user interface and a calculation/evaluation facility, which may function as the "engine" or "inference engine" with which the business domain knowledge (which is encoded in the form of formulas in selected templates in the workbook) is applied to acquired information about the business (which is contained in data cells in selected questionnaires or other data input templates in the workbook).

Consulting assessment environment 506 contains one or more templates, as represented by template class 510. In a preferred embodiment of the invention in which consulting assessment environment 506 takes the form of a MICROSOFT EXCEL spreadsheet workbook, each template is a separate worksheet or page within the workbook. Each template has a "hidden" attribute 512, which represents whether that template is to be made inaccessible to client 505 or other clients. This allows consulting assessment environment to be provided to the client as a deliverable product for the client's use, while still protecting sensitive proprietary information from being appropriated by the client or by others. For example, proprietary logic rules and formulas may be encoded in a hidden template, while input forms and reports are allowed to be accessed by the client. Thus, the client can view the input and output of an assessment, while the proprietary formulas used to derive the output from the input are hidden from view. One of ordinary skill in the art will recognize that this "hidden" attribute may also be employed in other non-spreadsheet-based embodiments of the invention, such as in a database application, expert system, or other application framework in which consulting assessment environment is implemented.

Template class 510 is a generalization of a number of different template classes in this preferred embodiment. One of ordinary skill in the art will recognize that an even greater variety of types or classes of templates may be employed in an actual embodiment without departing from the scope and spirit of the present invention. A data template or questionnaire (data template class 516) contains forms or data entry specifications, such as assessment questions, desired state descriptions, weight factors, benefit and risk descriptions.

Assessment framework class 518 denotes one or more templates that contain information regarding how to process input from a data template and achieve assessment metrics or other results. An assessment framework template may contain formulas 520, logic rules 522, and risk and benefit definitions 524 to be evaluated in order to map input from a data template into a set of assessment scores. For example, formulas might be defined so as to estimate the net present value (NPV) or internal rate of return (IRR) of various business activities in order to determine whether those business activities are profitable enough to continue in operation. Assessment scores may include numerical facts such as NPV or IRR, numerical or other number-like assessment scores (e.g., a Red-Orange-Yellow-Green or other color-based scoring), Boolean-valued determinations (e.g., "Division X of the company is mismanaged."), and the like.

In particular, assessment framework templates may be programmed to compare business information or assessment scores with best practices or other business goals to determine whether any gap exists between the current state of the business and a desired business state. This is known as "gap analysis." The existence of such a gap itself can also be considered as a type of assessment score. One of ordinary skill in the art will recognize that other forms of business domain knowledge, including that derived from personal experience and/or expertise of consultants may be encoded into assessment framework templates in the form of formulas, logic rules, and other template constructs.

Suggested actions template class 526 denotes a class of templates that contain actions to be suggested in response to particular assessment outcomes, such as gaps identified in gap analysis. A suggested action might be to sell off or close a particular business division that does not meet a desired level of profitability, for example. Consolidation template class 528 denotes a class of templates that contain information regarding the structure of a business, so that assessment results for sub-divisions of a business may be consolidated into results that are relative to a larger division or to the business as a whole. Report template class 530 represents a class of templates specifying the content and format of reports to be generated from assessment results, such as charts (chart class 534) and text-based summaries (text summary class 536).

Figure 6:
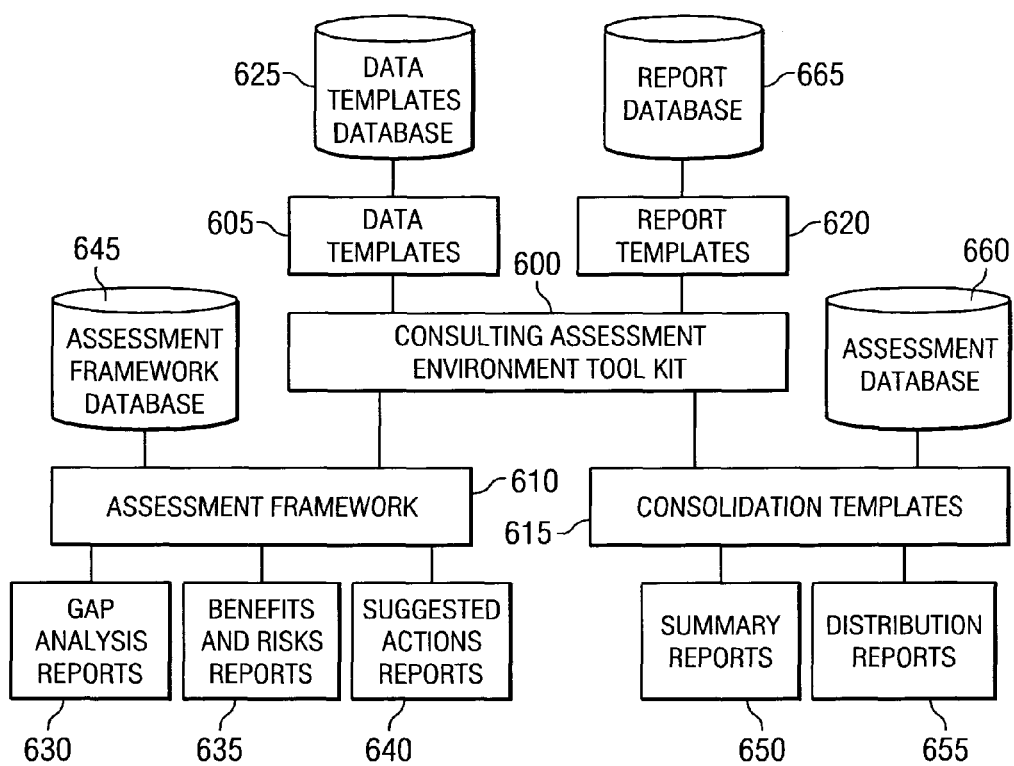
FIG. 6 is a block diagram of a consulting assessment environment tool kit in accordance with an alternative embodiment of the present invention employing databases.

FIG. 6 is a block diagram of a consulting assessment environment tool kit in accordance with an alternative embodiment of the present invention employing databases. Consulting assessment environment tool kit 600 automates the beginning data gathering activities and provides a self-service interview process that users can complete at their convenience, thus automating what is a time-consuming process for consultants. Consulting assessment environment tool kit 600 performs data analysis on the data that the user inputs in real time. Data synthesis is performed to relate the current state of the business to a desired state using an array or table structure to map data point relationships. Each user input from the self-service interview process provides a data point. Each data point has attributes that relate to particular criteria for determining the gaps between the current state and desired state of a business.

Consulting assessment environment tool kit 600 includes four interlinked components; these components are data templates component 605, assessment framework component 610, consolidation template component 615, and report templates component 620.

Data templates component 605 contains the content for label information, desired states or targets, interview questions, weighing factors, benefits and risks (exposures) descriptions and weight factors, suggested actions, costing areas, and terminology. Information for data templates component 605 is stored in a database, such as data templates database 625.

Assessment framework component 610 contains the calculation and logic for identification and general information gathering; gap calculations, scoring, analysis and reports, such as gap reports 630; benefit and risk mapping, scoring, analysis, and reports, such as benefits and risks reports 635; suggested actions mapping, scoring, analysis, and reports, such as suggested actions reports 640; and user input and feedback. Information for assessment framework component 610 is stored in a database, such as assessment framework database 645. Several repeatable business patterns are automated to allow consulting assessment environment tool kit 600 to analyze input from a user to produce assessment results in real time. The mapping of the data points from the user input provides traceability for the results. Every result can be traced to a question or set of questions in the self-service interview process.

Consolidation templates component 615 contains calculations and logic for consolidating individual assessment results, and produces summary and distribution reports, such as summary reports 650 and distribution reports 655. Summary reports for business process assessments may be produced at various levels, such as at a business unit level, a business function level, and a business area level. Information for consolidation templates component 615 is stored in a database, such as consolidation templates database 660.

Report templates component 620 defines the charts and graphs for the reports. Office productivity products, such as for example, MICROSOFT OFFICE, LOTUS SMARTSUITE, or web services may use report templates 620. Information for report templates component 620 is stored in a database, such as report templates database 665.

In the embodiment described in FIG. 6, consulting assessment environment tool kit 600 may be implemented as software application in a computer language or development framework that support access to database management systems. For example, consulting assessment environment tool kit 600 may be implemented as a program in the JAVA programming language using the JAVA Database Connectivity (JDBC) interface to access template and assessment databases in a relational or object-relational database management system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for providing a consulting assessment environment, the method comprising:
   a processor adapted to perform the steps of:
   determining an intended use for the consulting assessment environment, wherein the intended use is one of defining assessment business logic and conducting a self-assessment, wherein defining assessment business logic is performed by a consultant, wherein conducting a self-assessment is performed by the consultant or a client, and wherein self-assessment data is stored separately from the assessment business logic;
   responsive to determining that the intended use is defining assessment business logic, defining a data template, an assessment framework template, a suggested actions template, and a report template to create the assessment business logic for multiple types of assessments for assessing businesses, further comprising:
      encoding the data template, the assessment framework template, the suggested actions template, and the report template with formulas and logic rule definitions to define how self-assessment data is used to generate assessment results and recommendations;
      translating a plurality of hypotheses into interview questions for assessing a current state of a business; and
      encoding proprietary information and trade secrets into the data template, the assessment framework template, the suggested actions template, and the report template, wherein the proprietary information and the trade secrets of the consulting assessment environment are accessible to the consultant and are made inaccessible to clients using a hiding feature;
   responsive to determining that the intended use is conducting a self-assessment, receiving the self-assessment data about the business through a questionnaire, wherein the questionnaire is defined using the data template encoded with the interview questions and business-related domain knowledge of business practices;
   responsive to receiving the self-assessment data about the business, computing at least one assessment score based on the formulas and the logic rule definitions encoded in the assessment framework template;
   responsive to computing the at least one assessment score, determining an appropriate action based on the at least one assessment score and the suggested actions template encoded with business-related domain knowledge that defines actions to achieve desired states of businesses; and
   reporting results of the self-assessment data based on the at least one assessment score and the appropriate action in accordance with the report template, wherein the data template, the assessment framework template, and the suggested actions template encode business-related domain knowledge including at least one of best practices, business consultant expertise, and business goals, and wherein the proprietary information and the trade secrets of the consulting assessment environment are hidden from the client.

2. The method of claim 1 further comprising:
   determining the current state of the business based on the self-assessment data;
   identifying a desired state for the business using the assessment framework template and the suggested actions template to analyze the self-assessment data and to determine new business insights and recommendations for the business; and
   performing a gap analysis between the current state of the business and the desired state of the business to determine the appropriate action to achieve the desired state for the business using the suggested actions template.

3. The method of claim 1 further comprising:
   identifying benefits and risks for the current state of the business and for moving to a desired state of the business based on the at least one assessment score and the appropriate action.

4. The method of claim 1 further comprising:
   consolidating portions of the results together for further analysis, wherein the appropriate action is determined for a particular division or unit of the business.

5. The method of claim 1 further comprising:
   providing an interface for the client to conduct the self-assessment to gather the self-assessment data about the business, wherein the self-assessment data is used to determine the current state of the business, and wherein automated data synthesis is performed to relate the current state of the business to a desired state of the business in real time.

6. The method of claim 1, wherein the data template includes at least one of the interview questions, weighing factors, desired states, benefit descriptions, risk descriptions, suggested actions, cost areas, and terminology.

7. The method of claim 1, wherein the assessment framework template includes at least one of scoring information, calculations, suggested actions logic, benefit and risk logic, user feedback, and user input.

8. A computer program product in a computer readable storage medium for providing a consulting assessment environment, the computer program product comprising:
   computer usable program code stored in the computer readable storage medium, wherein the computer usable program code is adapted to cause a processor in a computer to perform steps comprising:
      determining an intended use for the consulting assessment environment, wherein the intended use is one of defining assessment business logic and conducting a self-assessment, wherein defining assessment business logic is performed by a consultant, wherein conducting a self-assessment is performed by the consultant or a client, and wherein self-assessment data is stored separately from the assessment business logic;
      responsive to determining that the intended use is defining assessment business logic, defining a data template, an assessment framework template, a suggested actions template, and a report template to create the assessment business logic for multiple types of assessments for assessing businesses, further comprising:
         encoding the data template, the assessment framework template, the suggested actions template, and the report template with formulas and logic rule definitions to define how self-assessment data is used to generate assessment results and recommendations;
         translating a plurality of hypotheses into interview questions for assessing a current state of a business; and
         encoding proprietary information and trade secrets into the data template, the assessment framework template, the suggested actions template, and the report template, wherein the proprietary information and the trade secrets of the consulting assessment environment are accessible to the consultant and are made inaccessible to clients using a hiding feature;
      responsive to determining that the intended use is conducting a self-assessment, receiving the self-assessment data about the business through a questionnaire, wherein the questionnaire is defined using the data template encoded with the interview questions and business-related domain knowledge of business practices;
      responsive to receiving the self-assessment data about the business, computing at least one assessment score based on the formulas and the logic rule definitions encoded in the assessment framework template;
      responsive to computing the at least one assessment score, determining an appropriate action based on the at least one assessment score and the suggested actions template encoded with business-related domain knowledge that defines actions to achieve desired states of businesses; and
      reporting results of the self-assessment data based on the at least one assessment score and the appropriate action in accordance with the report template, wherein the data template, the assessment framework template, and the suggested actions template encode business-related domain knowledge including at least one of best practices, business consultant expertise, and business goals, and wherein the proprietary information and the trade secrets of the consulting assessment environment are hidden from the client.

9. The computer program product of claim 8 further comprising:
   determining the current state of the business based on the self-assessment data;
   identifying a desired state for the business using the assessment framework template and the suggested actions template to analyze the self-assessment data and to determine new business insights and recommendations for the business; and
   performing a gap analysis between the current state of the business and the desired state of the business to determine the appropriate action to achieve the desired state for the business using the suggested actions template.

10. The computer program product of claim 8 further comprising:
    identifying benefits and risks for the current state of the business and for moving to a desired state of the business based on the at least one assessment score and the appropriate action.

11. The computer program product of claim 8 further comprising:
    consolidating portions of the results together for further analysis, wherein the appropriate action is determined for a particular division or unit of the business.

12. The computer program product of claim 8 further comprising:
    providing an interface for the client to conduct the self-assessment to gather the self-assessment data about the business, wherein the self-assessment data is used to determine the current state of the business, and wherein automated data synthesis is performed to relate the current state of the business to a desired state of the business in real time.

13. The computer program product of claim 8, wherein the data template includes at least one of the interview questions, weighing factors, desired states, benefit descriptions, risk descriptions, suggested actions, cost areas, and terminology.

14. The computer program product of claim 8, wherein the assessment framework template includes at least one of scoring information, calculations, suggested actions logic, benefit and risk logic, user feedback, and user input.

15. An apparatus for providing a consulting assessment environment, the apparatus comprising:
    a processor, and instructions stored in a memory, wherein the instructions are adapted to cause the processor to perform a plurality of steps comprising:
       determining an intended use for the consulting assessment environment, wherein the intended use is one of defining assessment business logic and conducting a self-assessment, wherein defining assessment business logic is performed by a consultant, wherein conducting a self-assessment is performed by the consultant or a client, and wherein self-assessment data is stored separately from the assessment business logic;
       responsive to determining that the intended use is defining assessment business logic, defining a data template, an assessment framework template, a suggested actions template, and a report template to create the assessment business logic for multiple types of assessments for assessing businesses, further comprising:

encoding the data template, the assessment framework template, the suggested actions template, and the report template with formulas and logic rule definitions to define how self-assessment data is used to generate assessment results and recommendations;

translating a plurality of hypotheses into interview questions for assessing a current state of a business; and encoding proprietary information and trade secrets into the data template, the assessment framework template, the suggested actions template, and the report template, wherein the proprietary information and the trade secrets of the consulting assessment environment are accessible to the consultant and are made inaccessible to clients using a hiding feature;

responsive to determining that the intended use is conducting a self-assessment, receiving the self-assessment data about the business through a questionnaire, wherein the questionnaire is defined using the data template encoded with the interview questions and business-related domain knowledge of business practices;

responsive to receiving the self-assessment data about the business, computing at least one assessment score based on the formulas and the logic rule definitions encoded in the assessment framework template;

responsive to computing the at least one assessment score, determining an appropriate action based on the at least one assessment score and the suggested actions template encoded with business-related domain knowledge that defines actions to achieve desired states of businesses; and reporting results of the self-assessment data based on the at least one assessment score and the appropriate action in accordance with the report template, wherein the data template, the assessment framework template, and the suggested actions template encode business-related domain knowledge including at least one of best practices, business consultant expertise, and business goals, and wherein the proprietary information and the trade secrets of the consulting assessment environment are hidden from the client.

16. The apparatus of claim 15 further comprising:

determining the current state of the business based on the self-assessment data;

identifying a desired state for the business using the assessment framework template and the suggested actions template to analyze the self-assessment data and to determine new business insights and recommendations for the business; and performing a gap analysis between the current state of the business and the desired state of the business to determine the appropriate action to achieve the desired state for the business using the suggested actions template.

17. The apparatus of claim 15 further comprising:

identifying benefits and risks for the current state of the business and for moving to a desired state of the business based on the at least one assessment score and the appropriate action.

18. The apparatus of claim 15 further comprising:

consolidating portions of the results together for further analysis, wherein the appropriate action is determined for a particular division or unit of the business.

19. The apparatus of claim 15 further comprising:

providing an interface for the client to conduct the self-assessment to gather the self-assessment data about the business, wherein the self-assessment data is used to determine the current state of the business, and wherein automated data synthesis is performed to relate the current state of the business to a desired state of the business in real time.

20. The apparatus of claim 15, wherein the data template includes at least one of the interview questions, weighing factors, desired states, benefit descriptions, risk descriptions, suggested actions, cost areas, and terminology.

21. The apparatus of claim 15, wherein the assessment framework template includes at least one of scoring information, calculations, suggested actions logic, benefit and risk logic, user feedback, and user input.

* * * * *